United States Patent [19]

Van Vooren et al.

[11] Patent Number: 5,066,032

[45] Date of Patent: Nov. 19, 1991

[54] WHEEL CHAIR CYCLE APPARATUS

[76] Inventors: Charles R. Van Vooren, 2409 Adrian St.; Leslie W. Austin, 540 Strathaven Ct., both of Turlock, Calif. 95380

[21] Appl. No.: 578,685

[22] Filed: Sep. 7, 1990

[51] Int. Cl.[5] .............................................. B62M 1/02
[52] U.S. Cl. ........................... 280/304.1; 297/DIG. 4
[58] Field of Search .................. 280/261, 250.1, 281.1, 280/282, 288.1, 304.1; 297/DIG. 4; 272/73

[56] References Cited

U.S. PATENT DOCUMENTS

| | | | |
|---|---|---|---|
| 4,333,664 | 6/1982 | Turner | 280/261 |
| 4,471,972 | 9/1984 | Young | 280/304.1 |
| 4,548,421 | 10/1985 | Wiener | 280/288.1 |
| 4,572,501 | 2/1986 | Durham et al. | 280/250.1 |
| 4,659,098 | 4/1987 | Jacobson | 280/288.1 |

FOREIGN PATENT DOCUMENTS 1242473  9/1988  Canada ............................ 280/288.1

Primary Examiner—Charles A. Marmor
Assistant Examiner—Mitchell Bompey
Attorney, Agent, or Firm—Leon Gilden

[57] ABSTRACT

An apparatus including a wheel chair, with a horizontal mount positioned between upper and lower horizontal framework members of the wheel chair, with a yoke member secured to the mount positioned interiorly of the wheel chair framework. A bicycle structure includes a forward and rear wheel mounted within a framework, with the framework further including drive crank mounted to the frame of the bicycle adjacent an upper tubular extent of the framework, and wherein the bicycle includes a rearwardly directed boss member securable to the yoke of the wheel chair, wherein the boss member is spaced above a lower contact portion of a rear wheel of the bicycle a predetermined distance greater than a spacing of the yoke relative to a bottom contact surface of a forward wheel assembly of the wheel chair to elevate a forward end of the wheel chair in securement to the bicycle.

5 Claims, 4 Drawing Sheets

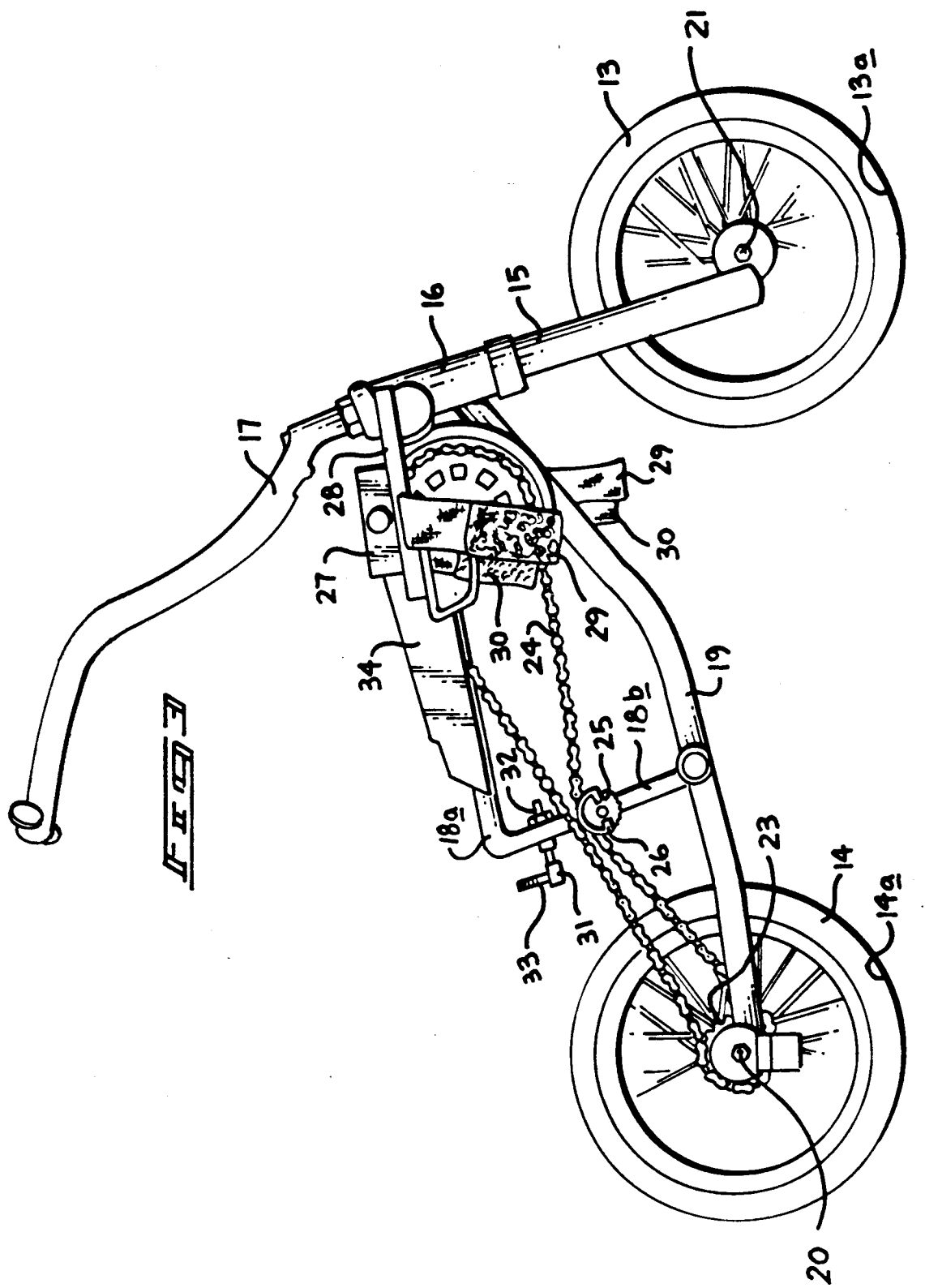

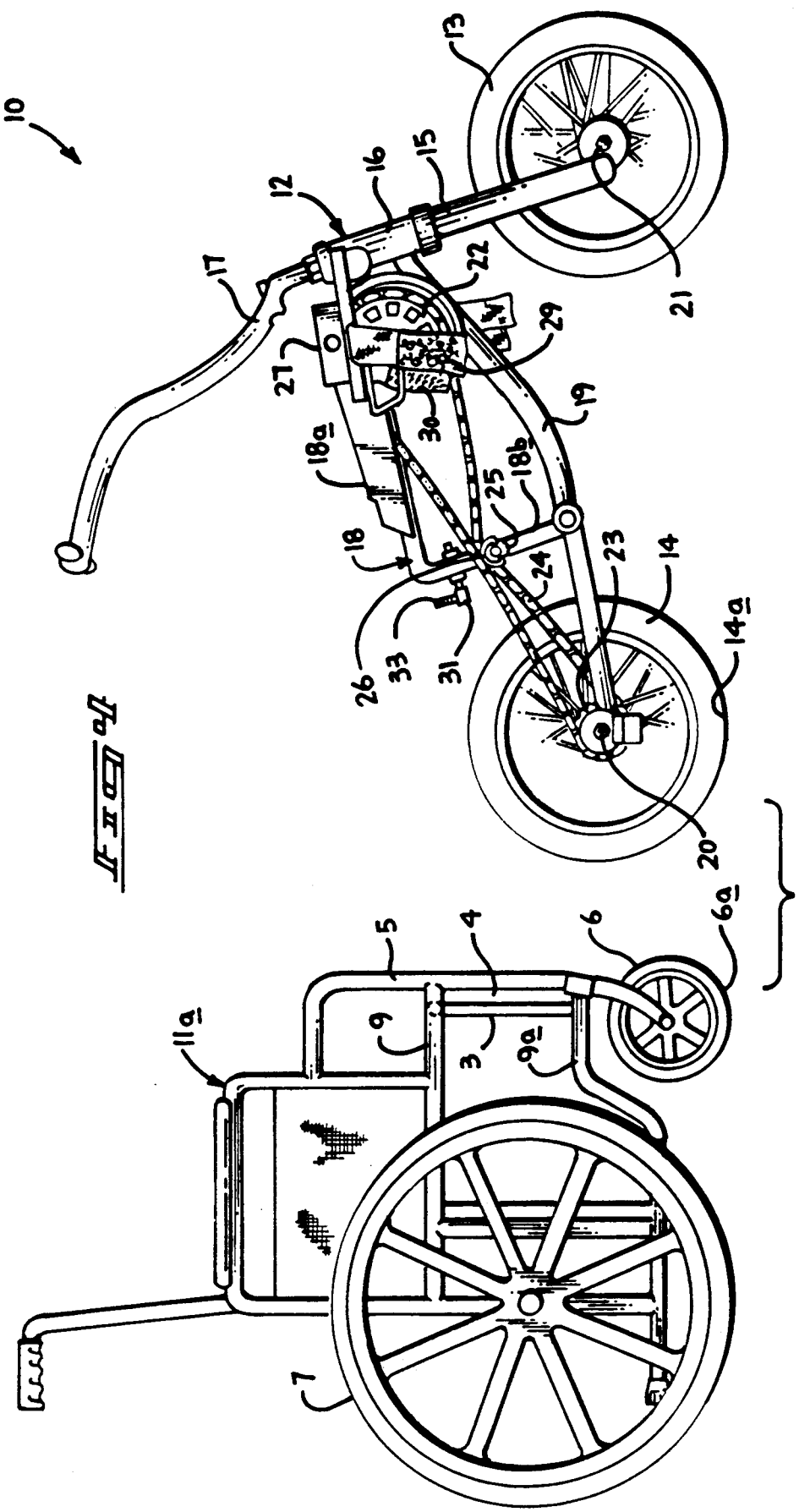

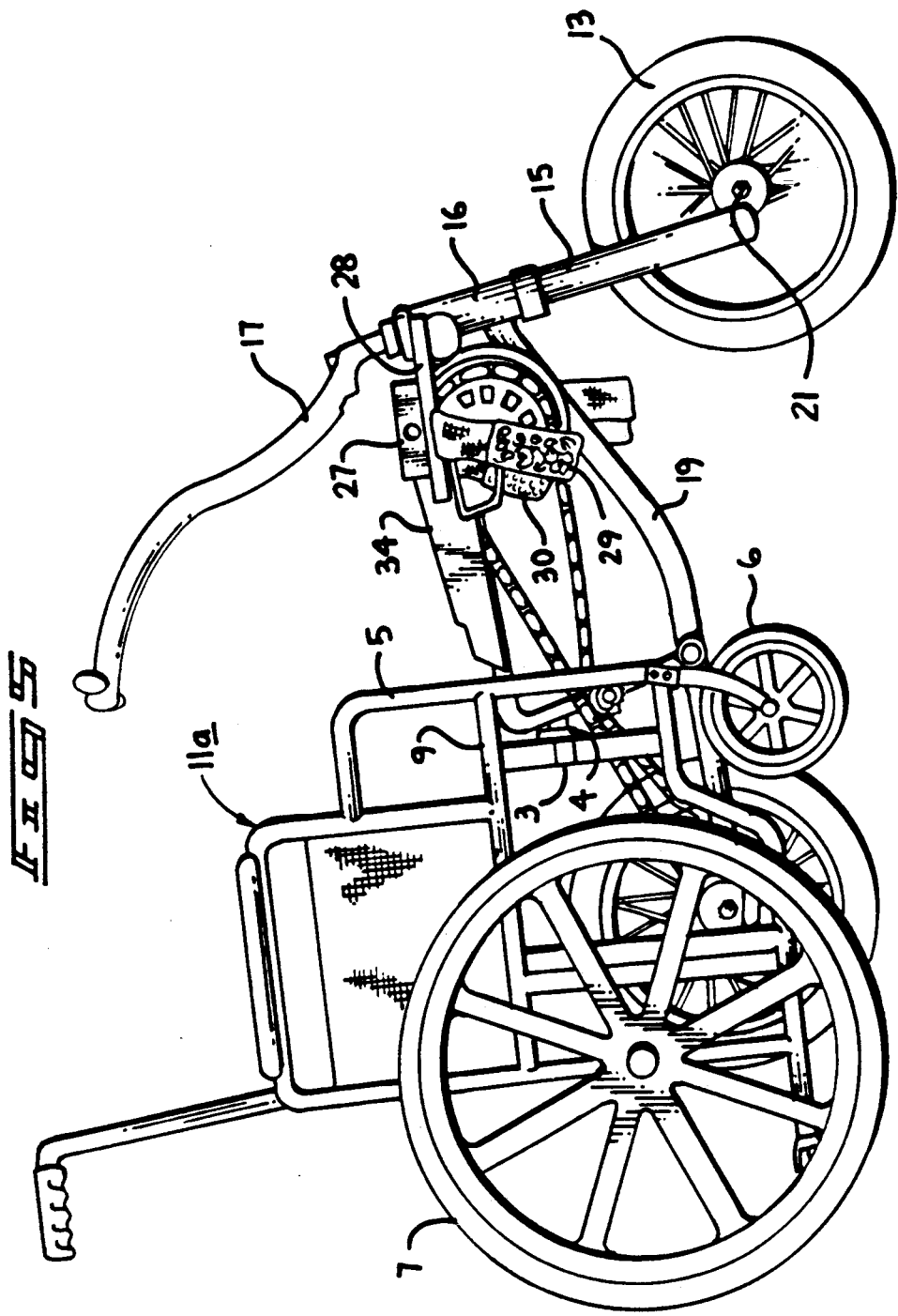

WHEEL CHAIR CYCLE APPARATUS

BACKGROUND OF THE INVENTION

1. Field of the Invention

The field of invention relates to a cycle structure for use with wheel chairs, and more particularly a wheel chair cycle apparatus wherein the same permits selective securement and association of a bicycle structure to an associated wheel chair to permit use of the bicycle structure.

2. Description of the Prior Art

The prior art has provided various organizations for use with wheel chairs to permit the disabled operative use of the wheel chair with a further type of wheeled vehicle that has heretofore failed to provide cycle structure as set forth by the instant invention which permits the use of a bicycle structure to effect mobility of the wheel chair and guidance thereof. An occupant of the wheel chair having use of at least one leg member may effect mobility of the organization in use.

Examples of prior art structure relative to wheel chair apparatus may be found in U.S. Pat. No. 4,789,175 to Schramm wherein a unicycle structure is mounted rearwardly of an associated wheel chair to permit an occupant of a wheel chair to have use of a helper and the like when mounted on the cycle structure rearwardly of the wheel chair.

U.S. Pat. No. 4,720,117 to Hay provides a peddling attachment for a wheel chair, wherein a unicycle structure is provided with a drive sprocket structure mounted at an uppermost level thereof to permit manual manipulation of the drive sprocket structure by an occupant of the wheel structure.

U.S. Pat. No. 4,824,132 to Moore provides an exercise device for use with a wheel chair, with the exercise device mounted upon a framework to permit securement of the wheel chair to enable an individual to exercise while seated in the associated wheel chair.

U.S. Pat. No. 4,830,388 to Wang provides for a wheel chair assembly, with a cycle structure mounted thereto to permit multiple use of the cycle structure in association with a wheel chair.

U.S. Pat. No. 4,865,344 to Romero, Sr., et al. provides for a wheel chair attachment permitting rotation of a sprocket structure and associated rotation of the rear wheels of the wheel chair.

As such, it may be appreciated that there continues to be a need for a new and improved wheel chair cycle apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of wheel chair accessory apparatus now present in the prior art, the present invention provides a wheel chair cycle apparatus wherein the same permits selective securement of a bicycle structure to an associated wheel chair to permit stability in the organization in use as a cycle structure by an occupant of the wheel chair. As such, the general purpose of the present invention, which will be described subsequently in greater detail, is to provide a new and improved wheel chair cycle apparatus which has all the advantages of the prior art wheel chair apparatus and none of the disadvantages.

To attain this, the present invention provides an apparatus including a wheel chair, with a horizontal mount positioned between upper and lower horizontal framework members of the wheel chair, with a yoke member secured to the mount positioned interiorly of the wheel chair framework. A bicycle structure includes a forward and rear wheel mounted within a framework, with the framework further including drive crank mounted to the frame of the bicycle adjacent an upper tubular extent of the framework, and wherein the bicycle includes a rearwardly directed boss member securable to the yoke of the wheel chair, wherein the boss member is spaced above a lower contact portion of a rear wheel of the bicycle a predetermined distance greater than a spacing of the yoke relative to a bottom contact surface of a forward wheel assembly of the wheel chair to elevate a forward end of the wheel chair in securement to the bicycle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheel chair cycle apparatus which has all the advantages of the prior art wheel chair apparatus and none of the disadvantages.

It is another object of the present invention to provide a new and improved wheel chair cycle apparatus which may be easily and efficiently manufactured and marketed.

It is a further object of the present invention to provide a new and improved wheel chair cycle apparatus which is of a durable and reliable construction.

An even further object of the present invention is to provide a new and improved wheel chair cycle apparatus which is susceptible of a low cost of manufacture with regard to both materials and labor, and which accordingly is then susceptible of low prices of sale to the consuming public, thereby making such wheel chair cycle apparatus economically available to the buying public.

Still yet another object of the present invention is to provide a new and improved wheel chair cycle apparatus which provides in the apparatuses and methods of the prior art some of the advantages thereof, while simultaneously overcoming some of the disadvantages normally associated therewith.

Still another object of the present invention is to provide a new and improved wheel chair cycle apparatus wherein the same is readily secured to an associated wheel chair to permit use of the cycle apparatus by an occupant of the wheel chair and simultaneously effect stability in use of the organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the cycle structure utilized by the instant invention.

FIG. 4 is an orthographic side view, taken in elevation, of the instant invention in a disassembled orientation.

FIG. 5 is an orthographic side view, taken in elevation, of the instant invention in an assembled orientation.

DESCRIPTION OF THE PREFERRED EMBODIMENT

Figure 1:
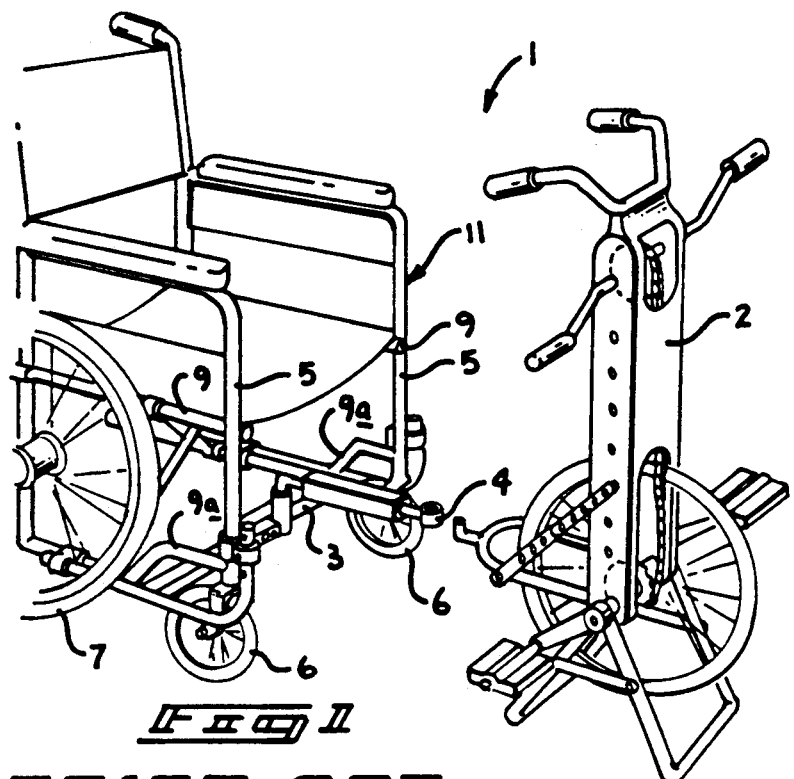
FIG. 1 is an isometric illustration of a prior art wheel chair apparatus in association with a rearwardly mounted cycle structure.

With reference now to the drawings, and in particular to FIGS. 1 to 5 thereof, a new and improved wheel chair cycle apparatus embodying the principles and concepts of the present invention and generally designated by the reference numeral 10 will be described.

Figure 2:
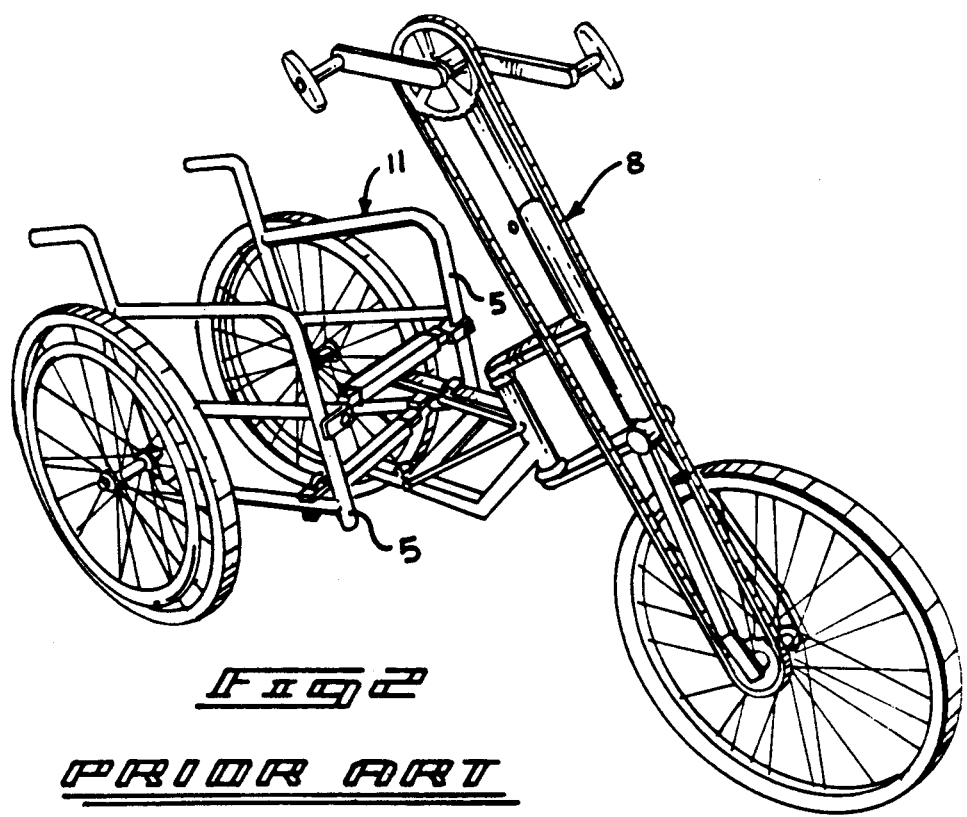
FIG. 2 is an isometric illustration of a prior art unicycle structure mounted to a forward end of a wheel chair.

FIG. 1 illustrates a prior art wheel chair apparatus 1, wherein the wheel chair 11 cooperates with an exercise structure 2. The wheel chair apparatus includes spaced vertical frame rails 5, with a cross brace 3 orthogonally directed therebetween. Further, the wheel chair assembly 11 includes an upper and lower pair of horizontal frame bars 9 and 9a respectively mounted orthogonally to each vertical frame rail 5. Conventional rear wheel assemblies 7 are mounted rearwardly of the wheel chair, with a plurality of front wheel assemblies 6 mounted in operative association with the vertical frame rails. The exercise apparatus 2 includes pedal structure for operative rotation of a drive chain by either use of legs or arm power by an occupant of an associated wheel chair. The eye bolt, or yoke 4, is mounted to the cross brace 3 to receive an associated upstanding plug of the exercise apparatus 2, as set forth in U.S. Pat. No. 4,824,132. FIG. 2 sets forth the apparatus, wherein the exercise organization 8 is mounted to a forward end of the wheel chair 11 forwardly of the framework, in a similar matter as the apparatus as set forth in FIG. 1, to permit mobility and conversion of the organization into a tricycle unit, in a manner as set forth in U.S. Pat. No. 4,720,117.

More specifically, the wheel chair cycle apparatus 10 of the instant invention essentially comprises a modified wheel chair assembly 11a, wherein the cross brace 3 mounts the yoke, or eye bolt 4, interiorly of the framework of the wheel chair assembly 11a rearwardly of the vertical frame rail 5 and positioned between the upper and lower horizontal frame rails 9 and 9a. Each front wheel assembly 6 includes a front wheel assembly bottom contact surface 6a in association with a support surface defining a first predetermined spacing between the yoke 4 and the front wheel assembly bottom contact surface 6a. The bicycle member 12 includes a forward bicycle wheel 13 and a rear bicycle wheel 14, each including a respective bottom contact 13a and 14a. The forward wheel 13 includes a forward wheel support tube 15, with a forward axle 21 rotatably mounting the forward wheel 13. The bicycle assembly includes a frame neck tube 16 slidably and rotatably receiving the forward wheel support tube 15 therewithin, with a handle bar member 17 mounted to the forward wheel support tube 15 extending upwardly from the frame neck tube 16 to permit relative rotation of the forward wheel support tube and the associated forward wheel 13, in a conventional manner. The bicycle member 12 further includes an "L" shaped upper frame bar 18 defined by a horizontal bar 18a and a vertical bar 18b, with the vertical bar 18b orthogonally intersecting a lower arcuate frame bar 19. The lower arcuate frame bar 19 and the horizontal bar 18a are fixedly mounted to the frame neck tube 16. Drive sprocket 22 is mounted to the horizontal bar 18a, and includes an endless drive chain 24 operatively associated to a drive sprocket 23 that is coaxially mounted to the rear axle 20 to effect rotation of the rear bicycle wheel 14 upon rotation of the drive sprocket 22. The endless drive chain 24 includes a lower extent positioned over an idler sprocket 25 to position the lower extent of the drive chain 24 above and out of contact with interference with an individual's legs as they are rotated through a full cycle in rotation of the drive sprocket 22. The idler sprocket 25 is rotatably mounted medially of the vertical bar 18b and includes an idler sprocket guard 26 mounted about and exteriorly of the idler sprocket 25 to capture the lower extent of the drive chain 24 between the vertical bar 18b and the guard 26. A drive chain shield 34 is mounted to the horizontal bar 18a to prevent contact of an upper extent of the drive chain 24 with an occupant of the wheel chair when the bicycle member 12 is mounted to the wheel chair. The drive sprocket 22 includes a crank drive, with a drive pedal 27 mounted to each of the drive legs, with each drive pedal including a platform 28, with each platform including a first and second hook and loop strap member 29 and 30 mounted to the platform to fixedly secure each foot of an occupant of the wheel chair to each drive pedal 27. A mounting boss 31 that includes a mounting boss fastener 32 is orthogonally directed through the vertical bar 18b adjacent the horizontal bar 18a, with the mounting boss 31 including a threaded support boss 33 extending orthogonally and upwardly relative to the mounting boss to receive the yoke 4 thereabout, in a manner as illustrated in FIG. 5. A second predetermined spacing is defined between an upper surface of the mounting boss 31 and the rear wheel bottom contact surface 14a, with the second predetermined spacing greater than the first predetermined spacing to lift the front wheel assemblies 6 out of contact with the support surface in use of the organization. It should be further noted that the bicycle structure in cooperation with the spaced rear wheel assemblies 7 provide a stable structure in operation of the unit to minimize and prevent tippage of the organization in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel chair cycle apparatus comprising, in combination,
    a wheel chair assembly, wherein the wheel chair assembly includes a framework, including a plurality of spaced vertical frame rails, with each frame rail including an upper and lower horizontal frame rail, and
    the spaced vertical frame rails including a cross brace positioned rearwardly of the spaced vertical frame rails between the upper and lower horizontal frame rails, and the cross brace includes a yoke, with the yoke positioned rearwardly of the spaced vertical frame rails within the framework of the wheel chair assembly, and
    further including a bicycle member, wherein the bicycle member includes a forward bicycle wheel and a rear bicycle wheel, and
    a bicycle framework, wherein the bicycle framework includes a lower arcuate frame bar and an "L" shaped upper frame bar, with the upper frame bar including a horizontal bar member, and a vertical bar member, with the vertical bar member intersecting the lower arcuate frame bar, and
    mounting means integrally secured to the vertical bar member of the bicycle for securement to the yoke of the wheelchair in order to fasten the bicycle member to the wheel chair assembly, and
    the bicycle framework including a frame neck tube, with the frame neck tube integrally secured to a forward terminal end of the horizontal bar and a forward terminal end of the lower arcuate frame bar, and
    a forward bicycle wheel including a forward axle, with the forward axle mounted to a forward wheel support tube, and the forward wheel support tube rotatably mounted within the frame neck tube, and a handle bar member mounted to the forward wheel support tube within the frame neck tube, and
    a rear bicycle wheel including a rear axle mounted to the lower arcuate frame bar at rear terminal end of the lower arcuate frame bar, and
    motive means rotatably mounted to the horizontal bar to effect rotation of the rear bicycle wheel.

2. An apparatus as set forth in claim 1 wherein the wheel chair assembly includes a plurality of rear wheels mounted to a rear portion of the wheel chair assembly framework, and a plurality of front wheel assemblies, with a front wheel assembly mounted to a lower terminal end of each vertical frame rail, and each front wheel assembly including a first contact surface to overlie a support surface, with a first predetermined spacing defined between the yoke and the first bottom contact surface, and the mounting means including a mounting boss mounted to the vertical bar member, with the mounting boss including a threaded support boss for reception within the yoke orthogonally and integrally mounted to an upper surface of the mounting boss, where a second predetermined spacing is defined between the upper surface of the mounting boss, and a second contact surface defined by a bottom contact surface of the rear bicycle wheel, with the second predetermined spacing greater than the first predetermined spacing to effect elevation of the front wheel assemblies when the mounting boss is mounted to and underlying the yoke of the wheel chair assembly.

3. An apparatus as set forth in claim 2 wherein the motive means includes a drive sprocket, wherein the drive sprocket is rotatably mounted to the horizontal bar, and a driven sprocket mounted coaxially of the rear bicycle wheel, and an endless chain directed between the drive sprocket and driven sprocket, and an idler sprocket mounted medially of the vertical bar, and the endless drive chain including an upper extent and a lower extent, with the upper extent overlying the idler sprocket, and the idler sprocket further including an idler sprocket guard to capture the lower extent of the endless drive chain between the idler sprocket guard and the vertical bar of the "L" shaped upper frame bar.

4. An apparatus as set forth in claim 3 including a drive chain shield mounted to the horizontal bar of the "L" shaped frame bar to prevent inadvertent contact between an occupant of the wheel chair assembly when the bicycle member is operatively mounted to the wheel chair assembly.

5. An apparatus as set forth in claim 4 wherein the drive sprocket includes a plurality of drive pedals, each drive pedal includes a platform underlying and mounted to each drive pedal, and each platform includes a first and second hook and loop fastener strap member mounted to each platform to effect securement of a foot member of the occupant mounted within the wheel chair assembly.

* * * * *